United States Patent Office 3,211,709
Patented Oct. 12, 1965

3,211,709
SULFUR-VULCANIZEABLE INTERPOLYMERS OF AT LEAST TWO ALPHA-OLEFINS AND AN UNSATURATED BRIDGED-RING HYDROCARBON
Stephen Adamek, Edward Allan Dudley, and Raymond Thomas Woodhams, all of Toronto, Ontario, Canada, assignors, by mesne assignments, to Hercules Powder Company, Wilmington, Del., a corporation of Delaware
No Drawing. Filed July 14, 1958, Ser. No. 748,165
Claims priority, application Great Britain, July 17, 1957, 22,601/57; Nov. 16, 1957, 33,753/57
19 Claims. (Cl. 260—80.7)

This invention relates to hydrocarbon copolymers, especially elastomeric copolymers, and their method of preparation.

In the production of synthetic elastomers it is an advantage if the product is such that it can be vulcanized with sulfur since the elastomers can then be fabricated into articles by methods and machinery similar to those used in the fabrication of natural rubber. However, in order to obtain vulcanizable elastomers it is necessary to ensure that they contain some unsaturation in the molecule.

It is an object of this invention to provide copolymers possessing a sufficient degree of unsaturation to enable them to be vulcanized with sulfur.

Accordingly, the present invention provides a copolymer of an aliphatic mono-olefine and an unsaturated bridged-ring hydrocarbon which contains at least two double bonds.

The invention also includes a method of preparing a copolymer which comprises reacting together an aliphatic mono-olefine and an unsaturated bridged-ring hydrocarbon which contains at least two double bonds in the presence of a surface-active catalyst.

The preferred olefines are those containing up to eight carbon atoms in the molecule and particularly useful products are obtained when two, three or more olefines are copolymerized with the bridged-ring hydrocarbon since the copolymers have a high solubility in organic solvents and good processing characteristics.

The mono-olefines preferably comprise a major proportion of the reaction mixture and, consequently, of the copolymer; for example the olefines can comprise from 50 percent to 97.5 percent by weight of the mixture or of the copolymer but proportions of 85 to 95 percent are preferred. The mixed olefines are generally used in equimolecular proportions but these can be varied over a wide range. This enables mixed monomer streams, i.e. the olefine fractions obtained in the distillation and cracking of petroleum, to be used directly as purchased after drying or they may be enriched with one or more of the pure components to give the desired monomer ratios, thus providing substantial flexibility for using a wide variety of available materials.

It is however preferred that any one mono-olefine should be used in the reaction to the extent of at least 5 percent by weight of the total mixed mono-olefine content. The preferred copolymers are those wherein each of said mono-olefines is present in an amount of at least 5% by weight of the total mono-olefine content of the copolymer.

Olefines which are particularly suitable are those containing a double bond in the alpha position and olefines containing up to eight carbon atoms in the molecule. Examples of suitable aliphatic mono-olefines which can be used, in combination are ethylene, propylene, butene-1, pentenes, hexenes, heptenes, octenes, nonenes and decenes, with chains which are linear.

The endocyclic compounds which can be used in this invention should contain at least two double bonds.

The preferred compounds are the endocyclic hydrocarbons containing seven to ten carbon atoms and two double bonds, especially those containing a bridge of one or two methylene groups. Substituted endocyclic hydrocarbons such as the alkyl, aryl and cycloalkyl derivatives can also be used.

Examples of suitable bridged-ring hydrocarbons are:
(a) Unsaturated derivatives of bicyclo(2,2,1)heptane, containing at least two double bonds, including bicyclo(2,2,1)hepta - 2,5-diene, bicyclo pentadiene. This name is used for the hydrocarbon having the formula:

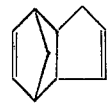

and more correctly named 1,4-endomethylene hydrind-2,6-diene; tricyclopentadiene and tetracyclopentadiene.
(b) Unsaturated derivatives of bicyclo(2,2,2)octane containing at least two double bonds including bicyclo(2,2,2)octa-2,5-diene.
(c) Unsaturated derivatives of bicyclo(3,2,1)octane containing at least two double bonds.
(d) Unsaturated derivatives of bicyclo(3,3,1)nonane containing at least two double bonds.
(e) Unsaturated derivatives of bicyclo(3,2,2)nonane containing at least two double bonds.

One method of preparing the copolymers of this invention consists in reacting the monomers together in a common solvent in the presence of a surface-active catalyst. A convenient procedure is to dissolve the bridged-ring hydrocarbon in the solvent containing dispersed catalyst and to pass a gaseous olefine or mixture of olefines into the solution.

The surface-active catalysts used in preparing the copolymers are of the type whereby the polymerization is effected by the adsorption of the monomer on the active surfaces thereof. Examples of these surface-active catalysts are mixtures of a compound of a heavy metal selected from the B sub-groups of groups IV to VII or group VIII of the periodic table together with a compound selected from one of the following classes:
(a) An organic compound of a metal of groups I to IV of the periodic table, preferably of groups II and III,
(b) A metal hydride or organo-metal hydride,
(c) An organo-metal halogen compound.

The speed of the polymerization reaction is furthermore influenced by the degree of sub-division of the active surface with which the unsaturated compounds are brought into contact. For instance, the surface-active catalyst can be adsorbed on cryolite or on a finely divided filler such as silica or carbon black. The silica can consist of either a three-dimensional cross linked network or a lattice distorted by the presence of an element of variable valency such as chromium or iron.

A typical catalyst of this kind is obtained by reacting an aluminum tri-alkyl with a tetrahalide of titanium or vanadium.

Any convenient solvent may be used, typical examples being: butane, hexane, heptane, octane and analogues. Mixtures of these alkanes, such as a mixture of hexane and heptane, which is available under the name petroleum ether, and kerosene can be used, also cyclohexane, methyl cyclohexane, benzene and toluene.

All monomers and solvents used in the polymerization process must be free of compounds containing active hydrogen such as alcohols, amines and acids, as well as oxygen, peroxides, ethers, esters, ketones, sulfides and particularly water.

The molecular weight of the copolymer and its distribution may be modified and regulated by varying catalyst proportions of temperature.

It has been found that the copolymers of this invention can be vulcanized with sulfur. A typical compound used was as follows, all parts being given by weight:

| | | |
|---|---|---|
| Polymer | parts | 100.0 |
| HAF carbon black | do | 30.0 |
| Zinc oxide | do | 5.0 |
| Stearic acid | do | 2.0 |
| Tellurium diethyldithiocarbamate | do | 0.5 |
| Tetramethyl thiuram disulphide | do | 1.0 |
| Triethylene tetramine | do | 0.2 |
| Sulfur | do | 2.0 |
| Cure temperature | ° F | 300 |
| Cure time (from cold mould) | minutes | 45 |

The method of compounding and testing samples of the copolymers was carried out according to the following procedure.

10 gram polymer samples were masterbatched on a laboratory mill. The carbon black was milled into the polymer, first at a temperature of 40–50° C. until it was thoroughly dispersed. The time required to accomplish this step varied from 5 to 10 minutes depending on the properties of the polymer milled. The addition of 5 to 10 parts of a milling aid such as Polygard greatly facilitated the addition of the black. The zinc oxide and stearic acid were then milled into the black loaded polymer followed by the curing materials. The temperature of the mill was lowered to 30° C. before incorporating the latter.

Duplicate ring moulds (3½ cm. O.D.) were pressed for each polymer sample along with controls containing no curatives. The extensibility for standard load and time (1500 and 3000 gram loads for one minute) were then determined.

The invention is illustrated by the following examples:

Example I 500 cc. of anhydrous petroleum ether (boiling range 100–120° C.) contained in a stirred two-liter glass resin pot was purged (or flushed) for 15 minutes at room temperature with a mixture of ethylene and propylene in equimolecular proportions. While maintaining the monomer flow, 20 ml. (0.081 mole) of aluminium triisobutyl were added from a graduated glass syringe to the solvent, followed by 4 ml. (0.036 mole) of titanium tetrachloride dissolved in 75 cc. of petroleum ether. The titanium tetrachloride solution was added slowly over a period of one minute while maintaining a temperature of 20° C. in the reaction vessel. The active catalyst formed a dark brown suspension. Immediately after the formation of the catalyst in the presence of the mono-olefins, a solution of 5 grams of bicyclopentadiene (technical grade) and 1 ml. of aluminium triisobutyl dissolved in 500 cc. of petroleum ether was allowed to drip in slowly at a constant rate from a dropping funnel. At the same time, 1000 cc. of petroleum ether were added dropwise from a second funnel. Rates of addition were regulated so that the bicyclopentadiene solution and the additional solvent were both depleted in a one hour reaction period after which approximately 100 grams of polymer had been formed. During this period, the ethylene/propylene monomer flow was maintained by means of calibrated flow meters at such a rate that none of the monomers was allowed to escape from the reaction vessel. Balance was achieved by means of a manometer at the outlet side. At the conclusion of the reaction the catalyst was destroyed by the addition of 50 cc. of methanol. The polymer was then precipitated by adding the entire contents of the reaction vessel into 2 litres of methanol. The polymer collected was washed twice with acidified methanol to remove decomposed catalyst salt, and once with methanol containing one part (based on polymer weight) of phenyl beta-naphthylamine as antioxidant. The polymer was set out on filter paper and allowed to dry overnight. Yield was 100 grams of a white elastic gum.

Example II

When the procedure of Example I was repeated with the addition of 10 grams of bicyclopentadiene instead of 5 grams the yield was 50 grams of white gum which was less rubbery than the polymer of Example I. The product was compounded and cured in the manner previously described and in the extensibility test the cured polymer gave no extension at 1500 gm. and an extension of 7 cm. at 3000 gm. load whereas the uncured product gave an extension of 8.5 cm. at 1500 gm. and under a load of 3000 gm. it broke at an extension of 20 cm. By operating as in Example I but maintaining a reaction temperature of −20° C. a yield of 90 grams of white, elastic gum was obtained. When the reaction was carried out at 50° C. the yield was 20 grams of white gum of low resilience.

Example III

Procedure followed was similar to that of Example I. Active catalyst was prepared by addition of 20 ml. of aluminium tri-isobutyl to 400 cc. of monomer saturated solvent followed by one milliliter of vanadium tetrachloride dissolved in 75 cc. of solvent while maintaining a temperature of −20° C. Then 20 grams of bicyclopentadiene and 1 cc. of aluminium tri-isobutyl dissolved in 400 cc. of solvent were added dropwise from a dropping funnel over a period of one hour together with 100 cc. of pure solvent from a second funnel. The simultaneous 1/1 mole ratio ethylene/propylene flow was maintained as described in Example I. Yield was 60 grams of white gum.

Example IV

The procedure followed was similar to that followed in Example I but substituting a mixture of ethylene and butene-1 in equimolecular proportions for the ethylene/propylene. Yield was 20 grams of white, soft, nonresilient, low-molecular weight material.

Example V

This example was carried out as in Example I but using an ethylene/propylene feed in a molecular ratio of 2:1. Yield was 37 grams of white, tough gum.

Example VI 50 grams each of propylene and butene-1 were condensed into a stirred Pyrex round bottomed 2-liter 3-neck standard taper flask containing initially 500 cc. of petroleum ether (boiling range 100–120° C.) maintained at −60° C. using an acetone-"Dry Ice" slush. 5 grams of bicyclopentadiene were added under a nitrogen blanket followed by a further 100 cc. of solvent. 20 ml. of aluminium tri-iso-butyl were added slowly from a syringe followed by a dropwise addition of one milliliter of vanadium tetrachloride dissolved in 50 cc. of solvent. Yield after one hour was 18 grams of white elastic gum.

Example VII

Procedure followed was similar to that described in Example I. 10 ml. of aluminium tri-iso-butyl and 2 ml. of vanadium tetrachloride were used to form the catalyst. 5 grams of bicyclopentadiene were added over a period of one hour. Temperature was maintained between −12 and −8° C. The catalyst formed a transparent, deep red solution. Yield was 125 grams of a tough, white gum having an intrinsic viscosity of 3.3. Intrinsic viscosity was determined in benzene at 30° C.

When the procedure was repeated using 15 grams of bicyclopentadiene a similar yield was obtained.

The sample obtained using 5 grams of bicyclopentadiene was compounded and cured in the manner previously described and in the extensibility test gave extensions of 5.5 cm. and 9 cm. at loads of 1500 gm. and 3000 gm. respectively. The uncured material gave an extension of 9 cm. at 1500 gm. and broke under a load of 3000 gm.

Example VIII

A stirred 2-liter standard taper 3-neck round-bottom Pyrex flask containing initially 300 cc. of petroleum ether (boiling range 40–60° C.) was flushed with an equimolecular ethylene/propylene mixture for 15 minutes prior to the addition of 10 ml. of aluminium tri-iso-butyl. One ml. of vanadium tetrachloride was dissolved in 100 cc. of solvent and filtered to remove precipitate. Whilst maintaining the olefine feed, this solution and 10 grams of bicyclopentadiene were added continuously to the reaction vessel. After one hour a transparent jelly-like mass was obtained which was washed with methanol. The yield was 100 grams of transparent elastic gum.

When this gum was compounded and cured in the manner previously described the following physical test results were obtained on the product:

Modulus at 100% extension _____ lb. per. sq. in.___ 450
Modulus at 300% extension _____ lb. per. sq. in.___ 800
Tensile strength _____ lb. per. sq. in.___ 800
Elongation _____ percent__ 300
Shore hardness _____ degrees__ 65–70

Example IX

By operating as in Example I, but with the addition of 10 grams of methyl cyclopentadiene dimer in place of bicyclopentadiene, a yield of 83 grams of white, tacky gum was obtained.

Example X

The procedure was similar to that followed in Example I except that 5 grams of bicyclo(2,2,1)hepta-2,5-diene were substituted for the bicyclopentadiene. The yield was 90 grams of white, resilient gum.

The product was compounded and cured in the manner previously described and in the extensibility test the cured material gave an extension of 14 cm. under a load of 1500 gm. and the uncured material 17 cm.

Example XI

When the procedure of Example X was repeated using 10 grams of the diene the yield fell to 60 grams and with 15 grams of diene the yield was 33 grams.

Example XII

By carrying out the procedure of Example X at a reaction temperature of −20° C. a yield of 115 grams of a white resilient gum were obtained which, when compounded and cured gave an extension of 9 cm. at a load of 3000 gm. whereas the uncured material broke under the same load.

Example XIII 400 ml. of anhydrous petroleum ether (boiling range 40–60° C.) contained in a stirred three-liter glass reaction vessel was purged (or flushed) by passing a stream of dry nitrogen for 15 minutes at room temperature. While the nitrogen flow was maintained 20 ml. of aluminium triisobutyl was added to the solvent from a calibrated glass syringe. The temperature of the solvent was lowered to −20° C. by cooling in a bath containing a slush of acetone and solid carbon dioxide. When this temperature was reached the stream of nitrogen was discontinued and a stream of 1:2:1 molar ratio of propylene, ethylene, and butene-1 passed in at such a rate that no gases escaped from the reaction vessel. After two or three minutes (the time necessary to dissolve the monomers to the saturation point of the least soluble component—ethylene) 4 ml. of filtered vanadium tetrachloride dissolved in 100 ml. of petroleum ether was added to form the active catalyst. At the same time, the rate of monomer input was increased but maintaining the same ratio as before to maintain a pressure approximately equal to one atmosphere. The balance was achieved by means of a bubbler located on the outlet side of the polymerization vessel. From a pressure equalizing dropping funnel 15 grams of dicyclopentadiene dissolved in 100 ml. of anhydrous petroleum ether was added drop-wise to the stirred reaction mixture over a period of 1 hour. As the copolymerization proceeded further solvent was added from a pressure-equalizing dropping funnel to the reaction mixture. The rate of addition of solvent was adjusted empirically, based on visual inspection of the viscosity of the reaction mixture. As the mixture became thicker, the solvent flow was increased to lower the viscosity and so maintain a high rate of polymerization. The gaseous monomer consumption was about 4 litres per minute initially and gradually fell to about 2 liters per minute near the completion of the reaction i.e. after approximately 60 minutes when the reaction vessel was full of polymer slurry. Polymerization was terminated by the addition of 50 ml. of methanol to destroy the catalyst. The copolymer was precipitated by pouring the contents of the reaction vessel into an excess of methanol and washed several times with acidified methanol to remove the decomposed catalyst salts.

Traces of residual acid were removed by washing with methanol.

The yield of copolymer was 97 grams and the product was a soft elastomer which possessed some self-adhesion.

Example XIV

The procedure described in Example I was followed but using as catalyst 10 ml. of aluminum tri-isobutyl and 1 ml. of filtered vanadium tetrachloride. The gaseous monomer stream consisted of a 1:1 molar ratio of propylene and ethylene mixture metered into the reaction vessel. A mixture containing 10 gm. dicyclopentadiene and 10 gm. redistilled octene-1 dissolved in 100 ml. anhydrous petroleum ether was added drop-wise over the 60 minutes reaction period. The copolymer separated as in Example I consisted of 80 gm. of rubbery mass which appeared to be homogeneous.

Example XV

The same procedure as in Example I was followed. The gaseous monomer stream used in this run consisted of a 1:1:0.2 molar ratio of ethylene, propylene and isobutene. 10 gms. of dicyclopentadiene dissolved in 100 ml. anhydrous petroleum ether was added over a period of 1 hour and the resulting copolymer separated as described in Example I. The product obtained was 104 grams of a tough white elastomer.

Example XVI

The same procedure as in Example I was followed. The gaseous monomer stream used in this example consisted of a 1:1:1 molar ratio of ethylene, propylene and butene-1. 10 grams of dicyclopentadiene dissolved in 100 ml. anhydrous petroleum ether were added over a period of 1 hour and the resulting copolymer separated as described in Example I consisted of 90 grams of a transparent elastomer.

This copolymer was compounded with sulfur and other ingredients according to the formula previously given and vulcanized in the manner described. Moulded rings (3½ cm. O.D.) were press-cured from the sample and tested. The following results were obtained.

Modulus at 300% elongation _____ lb. per sq. in__ 860
Tensile strength _____ lb. per sq. in__ 1030
Elongation at break _____ percent__ 360

Example XVII

A reactor was used consisting of a vertical jacketed stainless steel tube fitted with catalyst and monomer solution inlets at the top and a discharge back-pressure valve (preset at 175 lb. per sq. in.) at the bottom.

A monomer solution composed of 8.5 kgm. hexane, 6.5 kgm. propylene, 0.85 kgm. ethylene and 0.4 kgm. dicyclopentadiene was charged at 160 cc./minute through a precooling coil at −70° C. into the top of the tube reactor. Simultaneously, a continuous feed of catalyst was injected into the monomer line just prior to its entry into the reactor. The catalyst was prepared by continuously mixing equal volumes (10 cc. per minute) of solutions composed of 42.5 cc. of aluminium triisobutyl in 2100 cc. hexane and 15 cc. of vanadium tetrachloride in 2000 cc. hexane at −70° C. The rate of combined catalyst feed was approximately 0.09 mole per hour.

The polymerization reaction temperature was maintained as low as possible by circulating glycol at −20° C. through the reactor jacket. The polymer was collected and coagulated continuously in isopropanol as it left the discharge outlet. Flows of catalyst and monomer solutions were maintained at constant levels against the back-pressure of 175 lb. per sq. in. in the reactor by using a supply pressure of 225 lb. per sq. in. of dry nitrogen as a driving force.

The ethylene, propylene and nitrogen were purified prior to use by passing them through two drying columns, one filled with calcium chloride and the other with calcium hydride heated to 100° C. Hexane was purified by distillation from sodium dispersion and dicyclopentadiene by vacuum distillation.

After 35 minutes of reaction 120 grams of tough, resilient gum was obtained corresponding to an average conversion of 9.7%. The polymer was vulcanized with sulfur using the curing recipe previously given except that the amount of carbon black was increased to 40 parts and 10 parts of a mineral extending oil was also added. The cured polymer had the following properties:

Modulus at 300% _____lbs. per sq. in__ 1300
Tensile strength _____lbs. per sq. in__ 1700
Elongation at break _____percent__ 365
Hardness _____ 73–67

*Example XVIII*

The polymerization procedure was similar to that followed in Example X except that 4 ccs. of vanadium tetrachloride were added in place of the titanium tetrachloride and 2 grams of carbon black were present in the solvent during the preparation of the catalyst as a carrier. After a reaction period of one hour, 47 grams of polymer composed of ethylene, propylene and bicyclo(2,2,1)hepta-2,5-diene were recovered. On purifying and drying in the usual fashion a soft, white, highly resilient material containing small specks or agglomerates of black dispersed throughout, was obtained. A control experiment, made under identical conditions, but in the absence of black in the reactor, yielded 125 grams of polymer in 15 minutes reaction time. The activity of the catalyst formed in the presence of black, and hence the reaction rate, was therefore considerably decreased. The polymers so obtained were compounded and cured in the manner previously described but in the case of that prepared in the presence of black the amount of carbon black added was reduced to 28 parts. The physical properties were as follows:

*Polymer prepared in presence of carbon black*

Tensile strength _____lb. per sq. in__ 1600
Modulus at 300% _____lb. per sq. in__ 1100
Elongation at break _____percent__ 450
Hardness (Shore) _____ 70–67

*Control polymer*

Poor moulds were obtained and no cure was evident.
In the claims, all numerical ranges are inclusive and all percentages are by weight.

Having now described our invention, what we claim is:
1. A sulfur-vulcanizable, elastomeric copolymer of at least two straight chain α-olefins of from 2 to 10 carbon atoms and an ethylenically unsaturated bridged-ring hydrocarbon containing at least two ethylenic double bonds, at least one of said double bonds being in one of the rings of the bridged ring present in said hydrocarbon, said hydrocarbon being present in the copolymer in an amount imparting sulfur-vulcanizability, said hydrocarbon having from 7 to 20 carbon atoms, the total straight chain α-olefin content of said copolymer being at least 50%.

2. A sulfur-vulcanizable, elastomeric copolymer of at least two straight chain α-olefins of from 2 to 10 carbon atoms and an ethylenically unsaturated bridged-ring hydrocarbon containing at least two ethylenic double bonds, at least one of said double bonds being in one of the rings of the bridged ring present in said hydrocarbon, said hydrocarbon being present in the copolymer in an amount imparting sulfur-vulcanizability, each of said straight chain α-olefins being present in the copolymer in the amount of at least 5 weight percent of the total straight chain α-olefin content of the copolymer, said hydrocarbon having from 7 to 20 carbon atoms, the total straight chain α-olefin content of said copolymer being at least 50%.

3. A sulfur-vulcanizable, elastomeric copolymer of at least two straight chain α-olefins of from 2 to 10 carbon atoms and an ethylenically unsaturated bridged-ring hydrocarbon containing at least two ethylenic double bonds which are in the rings of said hydrocarbon, said hydrocarbon being present in the copolymer in an amount imparting sulfur-vulcanizability, said hydrocarbon having from 7 to 20 carbon atoms, the total straight chain α-olefin content of said copolymer being at least 50%.

4. A sulfur-vulcanizable, elastomeric copolymer of at least two straight chain α-olefins of from 2 to 10 carbon atoms and an ethylenically unsaturated hydrocarbon containing a carbon structure which includes the carbon structure of a member of the group consisting of bicyclo(2,2,1)heptane, bicyclo(2,2,2)octane, bicyclo(3,2,1)octane, bicyclo(3,3,1)nonane, and bicyclo(3,2,2)nonane, said hydrocarbon containing at least two ethylenic double bonds, at least one of said double bonds being in one of the rings of the bridged ring provided by said carbon structure of a member of said group, said hydrocarbon being present in the copolymer in an amount imparting sulfur-vulcanizability, said hydrocarbon having from 7 to 20 carbon atoms, the total straight chain α-olefin content of said copolymer being at least 50%.

5. A sulfur-vulcanizable, elastomeric copolymer of at least two straight chain α-olefins of from 2 to 10 carbon atoms and an ethylenically unsaturated hydrocarbon containing a carbon structure which includes the carbon structure of bicyclo(2,2,1)heptane and containing at least two ethylenic double bonds, at least one of said double bonds being in one of the rings of the bridged ring provided by said carbon structure of bicyclo (2,2,1)heptane, said hydrocarbon being present in the copolymer in an amount imparting sulfur-vulcanizability, said hydrocarbon having from 7 to 20 carbon atoms, the total straight chain α-olefin content of said copolymer being at least 50%.

6. A sulfur-vulcanizable, elastomeric copolymer of ethylene, at least one straight chain α-olefin of from 3 to 10 carbon atoms and an ethylenically unsaturated hydrocarbon containing a carbon structure which includes the carbon structure of bicyclo(2,2,1)heptane and containing at least two ethylenic double bonds, at least one of said double bonds being in one of the rings of the bridged ring provided by said carbon structure of bicyclo(2,2,1)heptane, said hydrocarbon being present in the copolymer in an amount imparting sulfur-vulcanizability, said hydrocarbon having from 7 to 20 carbon atoms, the total straight chain α-olefin content of said copolymer being at least 50%.

7. A sulfur-vulcanizable, elastomeric copolymer of at least two straight chain α-olefins of from 2 to 10 carbon atoms and an ethylenically unsaturated hydrocarbon containing a carbon structure which includes the carbon structure of bicyclo(2,2,1)heptane and containing two ethylenic double bonds, at least one of said double bonds being in one of the rings of the bridged ring provided by said carbon structure of bicyclo(2,2,1)heptane, said hydrocarbon being present in the copolymer in an amount imparting sulfur-vulcanizability, said hydrocarbon having from 7 to 20 carbon atoms, the total straight chain α-olefin content of said copolymer being at least 50%.

8. A sulfur-vulcanizable, elastomeric copolymer of ethylene, propylene, at least one straight chain α-olefin of from 4 to 10 carbon atoms, and an ethylenically unsaturated hydrocarbon containing a carbon structure which includes the carbon structure of bicyclo (2,2,1)heptane and containing two ethylenic double bonds, at least one of said double bonds being in one of the rings of the bridged ring provided by said carbon structure of bicyclo-(2,2,1)heptane, said hydrocarbon being present in the copolymer in an amount imparting sulfur-vulcanizability, said hydrocarbon having from 7 to 20 carbon atoms, the total straight chain α-olefin content of said copolymer being at least 50%.

9. A sulfur-vulcanizable, elastomeric copolymer of ethylene, at least one straight chain α-olefin of from 3 to 10 carbon atoms and an ethylenically unsaturated hydrocarbon containing a carbon structure which includes the carbon structure of bicyclo(2,2,1)heptane and containing two ethylenic double bonds in the rings of said hydrocarbon, said hydrocarbon being present in the copolymer in an amount imparting sulfur-vulcanizability, said hydrocarbon having from 7 to 20 carbon atoms, the total straight chain α-olefin content of said copolymer being at least 50%.

10. A sulfur-vulcanizable, elastomeric copolymer of ethylene, at least one straight chain α-olefin of from 3 to 10 carbon atoms and an ethylenically unsaturated hydrocarbon containing a carbon structure which includes the carbon structure of bicyclo(2,2,1)heptane and containing two ethylenic double bonds, at least one of said double bonds being in one of the rings of the bridged ring provided by said carbon structure of bicyclo(2,2,1)heptane, said hydrocarbon being present in the copolymer in an amount imparting sulfur-vulcanizability, said hydrocarbon having from 7 to 20 carbon atoms, the total straight chain α-olefin content of said copolymer being at least 50%.

11. The copolymer of claim 10 wherein said ethylenically unsaturated hydrocarbon is bicyclo(2,2,1)hepta-2,5-diene.

12. The copolymer of claim 11 wherein the straight chain α-olefin of from 3 to 10 carbon atoms is propylene.

13. The copolymer of claim 10 wherein the ethylenically unsaturated hydrocarbon is dicyclopentadiene.

14. The copolymer of claim 13 wherein the straight chain α-olefin of from 3 to 10 carbon atoms is propylene.

15. The copolymer of claim 10 wherein the ethylenically unsaturated hydrocarbon is the dimer of methylcyclopentadiene.

16. A sulfur-vulcanizable, elastomeric copolymer of ethylene, propylene, and an ethylenically unsaturated hydrocarbon containing a carbon structure which includes the carbon structure of bicyclo(2,2,1)heptane and containing two ethylenic double bonds, at least one of said double bonds being in one of the rings of the bridged ring provided by said carbon structure of bicyclo(2,2,1)-heptane, said hydrocarbon being present in the copolymer in an amount imparting sulfur-vulcanizability, said hydrocarbon having from 7 to 20 carbon atoms, the total straight chain α-olefin content of said copolymer being at least 50%.

17. A rubbery copolymer of ethylene consisting of ethylene, at least one alpha-olefin having the structure R—CH=CH$_2$, in which alpha-olefin R is a $C_1$-$C_8$ alkyl radical, and dicyclopentadiene, there being at least about 2.5 to 92.6% ethylene units by weight and at least about 2.5% to about 92.6% of said alpha-olefin units by weight, and, about 2.5 to 50% of dicyclopentadiene units by weight in said copolymer.

18. The copolymer of claim 17 wherein the alpha-olefin is propylene.

19. The copolymer of claim 17 wherein the alpha-olefin is 1-butene.

References Cited by the Examiner
UNITED STATES PATENTS

| | | | |
|---|---|---|---|
| 2,699,457 | 1/55 | Ziegler | 260—683.15 |
| 2,799,668 | 7/57 | Anderson et al. | 260—93.1 |
| 2,809,372 | 10/57 | Frederick et al. | 260—85.3 |
| 2,833,372 | 4/59 | Stamatoff | 260—88.2 |

JOSEPH L. SCHOFER, *Primary Examiner.*

MILTON STERMAN, B. MANGAN, *Examiners.*

PO-1050
(5/69)

UNITED STATES PATENT OFFICE
CERTIFICATE OF CORRECTION

Patent No. 3,211,709     Dated October 12, 1965

Inventor(s) Stephen Adamek, Edward Allan Dudley, and Raymond Thomas Woodhams

It is certified that error appears in the above-identified patent and that said Letters Patent are hereby corrected as shown below:

Column 1, line 11, "33,753/57" should read -- 35,753/57 --

Column 6, line 27, "The procedure described in Example I" should read -- The procedure described in Example XIII --

Column 6, lines 35-36, "Example I" should read -- Example XIII --

Column 6, line 40, "The same procedure as in Example I" should read -- The same procedure as in Example XIII --

Column 6, line 45, "Example I" should read -- Example XIII

Column 6, line 49, "The same procedure as in Example I" should read -- The same procedure as in Example XIII --

Column 6, line 55, "Example I" should read -- Example XIII

Signed and sealed this 31st day of December 1974.

(SEAL)
Attest:

McCOY M. GIBSON JR.
Attesting Officer

C. MARSHALL DANN
Commissioner of Patents